United States Patent
Korzhavina

(10) Patent No.: US 11,612,464 B2
(45) Date of Patent: Mar. 28, 2023

(54) FLOSS CUP

(71) Applicant: Olga Korzhavina, Bristol, CT (US)

(72) Inventor: Olga Korzhavina, Bristol, CT (US)

(\*) Notice: Subject to any disclaimer, the term of this patent is extended or adjusted under 35 U.S.C. 154(b) by 380 days.

(21) Appl. No.: 16/735,172

(22) Filed: Jan. 6, 2020

(65) Prior Publication Data

US 2020/0383760 A1   Dec. 10, 2020

Related U.S. Application Data

(60) Provisional application No. 62/858,500, filed on Jun. 7, 2019.

(51) Int. Cl.
| | |
|---|---|
| *B65D 25/10* | (2006.01) |
| *A61C 15/04* | (2006.01) |
| *B65D 3/24* | (2006.01) |
| *B65D 3/22* | (2006.01) |
| *B65D 43/16* | (2006.01) |

(52) U.S. Cl.
CPC ............. *A61C 15/043* (2013.01); *B65D 3/22* (2013.01); *B65D 3/24* (2013.01); *B65D 25/108* (2013.01); *B65D 43/16* (2013.01); *B65D 2209/00* (2013.01)

(58) Field of Classification Search
CPC ....... A61C 15/043; A61C 15/046; A61C 7/00; A61C 2202/00; A61C 19/02; B65D 25/108; B65D 2209/00; B65D 3/22; B65D 3/24; B65D 43/16

USPC ......................... 206/63.5, 362, 369
See application file for complete search history.

(56) References Cited

U.S. PATENT DOCUMENTS

| | | | |
|---|---|---|---|
| 3,431,041 A | 3/1969 | Fontlladosa | |
| 3,881,868 A \* | 5/1975 | Duke | A47K 1/09 206/520 |
| 7,063,822 B2 \* | 6/2006 | Goertz | A61C 17/036 206/209.1 |
| 2014/0208697 A1 \* | 7/2014 | Hohlbein | B65D 83/02 53/492 |
| 2014/0346067 A1 | 11/2014 | Martin | |
| 2016/0309938 A1 | 10/2016 | Ortiz | |

\* cited by examiner

*Primary Examiner* — Steven A. Reynolds
(74) *Attorney, Agent, or Firm* — DeLio Peterson & Curcio LLC; Brian G. Schlosser

(57) ABSTRACT

A portable floss cup that allows for quick and convenient access to un-used portable flossers is provided. The floss cup is sized to fit in the cup holder of one's vehicle, and may be composed of paper, plastic, or biodegradable materials. The cup is formed with an inner wall for receiving used portable flossers and waste therein, an outer wall having a diameter larger than the inner wall, and an upper wall extending between the inner and outer wall. Un-used portable flossers are radially disposed in slots provided around the upper wall. A lid large enough to cover the top of the cup may also be included. Once the flossers provided with the cup are expended, an end user may either replace the expended flossers with new un-used ones, or they may replace the cup entirely.

14 Claims, 4 Drawing Sheets

FLOSS CUP

BACKGROUND OF THE INVENTION

1. Field of the Invention

The present invention relates to portable containers. More particularly, the present invention relates to a container for dental floss that secures unused floss to the outer edges of the container, and receives used floss/other waste products within the container.

2. Description of Related Art

Portable flossers have become common in today's society. They are typically composed of a plastic body having a U-shaped gap at one end for holding a taught piece of floss between the gap, and a sharpened second end that acts as both a handle and a toothpick. These portable dental flossers have proven to be very useful for on-the-go situations.

Storage and disposal of these portable flossers present outside issues. People often use these portable flossers when they are traveling, due to their inherent on-the-go nature. The bags that these flossers are sold in are typically sealed and thus difficult to access in such on-the-go situations, such as when driving a vehicle. This results in the creation of less appealing and unsanitary means of access, such as leaving loose unused portable flossers in the vehicle's center console, cup holders, or side pockets located on the inside surfaces of the doors. Once a portable flosser has been used, they are either disposed of in these same locations (thus creating more unsanitary issues), or the user is required to hold on to the used portable flosser until they can locate a trash receptacle outside of the vehicle.

SUMMARY OF THE INVENTION

Bearing in mind the problems and deficiencies of the prior art, it is therefore an object of the present invention to provide a portable floss container that allows for easy, sanitary access to unused portable flossers.

It is another object of the present invention to provide a portable floss container that allows for easy, sanitary disposal of used, unsanitary portable flossers.

Still other objects and advantages of the invention will in part be obvious and will in part be apparent from the specification.

The above and other objects, which will be apparent to those skilled in the art, are achieved in the present invention which is directed to a method of storing and disposing of portable flossers. The method provides a plurality of new, un-used portable flossers having a body with a first end and a second end, the first end holding a taught piece of floss, and the second end having a handle. Also provided is a container body having an outer wall, a top portion and a base, the top portion having an opening therein sized for receiving waste in a receptacle portion and at least one opening sized for receiving the new, un-used portable flossers in a storage portion, the second ends of the plurality of portable flossers being disposed in the at least one opening in the storage portion of the container body, and the first ends of the plurality of portable flossers resting above the at least one opening on the storage portion of the container body. The method further provides a removable lid disposed over the top portion of the body sealing the plurality of portable flossers in the at least one opening of the storage portion and the opening in the receptacle portion. The steps of the method include removing the lid from the body, pulling a new, unused flosser from the at least one opening of the storage portion of the container body, flossing with the flosser, and disposing of the used flosser by placing it through the opening within the receptacle portion of the container body.

In an embodiment of the method, the container body has a base, an outer wall defined by a larger width, and an inner wall disposed within the outer wall. The inner wall is defined by a smaller width and forms the receptacle portion. The outer wall and inner wall have a gap therebetween forming the storage portion. An upper wall extends over the gap between the outer and inner wall and has the at least one opening receiving the portable flossers. The second ends of the plurality of portable flossers may be disposed in the gap between the inner wall and outer wall, and the first ends of the plurality of portable flossers rest above the at least one opening on the upper wall between the outer and inner walls.

In another embodiment of the method, the steps may further include inserting at least one un-used portable flosser into the at least one opening from which the disposed, used flosser was pulled.

In another aspect, the present invention is directed to a container for portable flossers, comprising a plurality of portable flossers having a body with a first end and a second end, the first end holding a taught piece of floss, and the second end having a handle. A container body has a base, an outer wall defined by a larger diameter, and an inner wall disposed within the outer wall and sized for receiving waste therein. The inner wall is defined by a smaller diameter, wherein a gap is formed between the outer wall and inner wall. The container body further has an upper wall extending from a top edge or rim of the inner wall to the outer wall. At least one opening is disposed on the upper wall of the container body, and is sized for receiving un-used portable flossers, such that the second end of the portable flosser is disposed in the gap between the inner wall and outer wall, and the first end of the portable flosser rests above the at least one opening on the upper wall of the container body. A removable lid has a diameter large enough to cover a top edge or rim of the outer wall.

In an embodiment, the removable lid is hingedly secured to the outer wall. The outer wall base and inner wall base may both be located at the bottom edge of the container body. A plurality of slots may be radially disposed around the upper wall of the cup. The inner wall base may be separate and distinct from the outer wall base, and the gap between said inner wall and said outer wall may expand between the inner wall base and the outer wall base. The lid may be cellophane or plastic wrap. The body may be composed of a material selected from the group consisting of paper, wax paper, cardboard, plastic, metal, or biodegradable material. The inner wall base may be further defined by a second diameter less than the smaller diameter, the inner wall gradually decreasing in diameter size from the inner wall rim down to the inner wall base. The outer wall base may be further defined by a second diameter less than the larger diameter and greater than the smaller diameter, the outer wall gradually decreasing in diameter size from the outer wall rim down to the outer wall base.

In yet another aspect, the present invention is directed to a container comprising a container body or cup having an outer wall defined by a larger diameter, a base, and a rim, and an inner wall disposed within the outer wall and defined by a smaller diameter and a rim, such that a gap is formed between the inner wall and the outer wall. An upper wall extends across the gap between the inner wall and the outer wall. At least one slot is disposed on the upper wall. The inner wall is sized to receive waste therein, and the upper wall at least one slot receives at least one portable flosser therein, such that a first end of the portable flosser rests above said at least one slot, and a second end of the portable flosser rests below said at least one slot and is suspended within the gap.

In an embodiment, the container further includes a removable lid having a diameter large enough to cover the rim of the outer wall. The removable lid may be hingedly secured to the outer wall rim. The inner wall may further comprise a base, and the outer wall base and inner wall base may both be located at the bottom edge of the container body or cup. The inner wall may further comprise a base separate and distinct from the outer wall base, and the gap between said inner wall and said outer wall expands between the inner wall base and the outer wall base. A plurality of slots may be radially disposed around the upper wall of the cup. The lid may be cellophane or plastic wrap. The body may be composed of a material selected from the group consisting of paper, wax paper, cardboard, plastic, metal, or biodegradable material.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE EMBODIMENT(S)

In describing the embodiment(s) of the present invention, reference will be made herein to FIGS. 1-4 of the drawings in which like numerals refer to like features of the invention.

Figure 1:
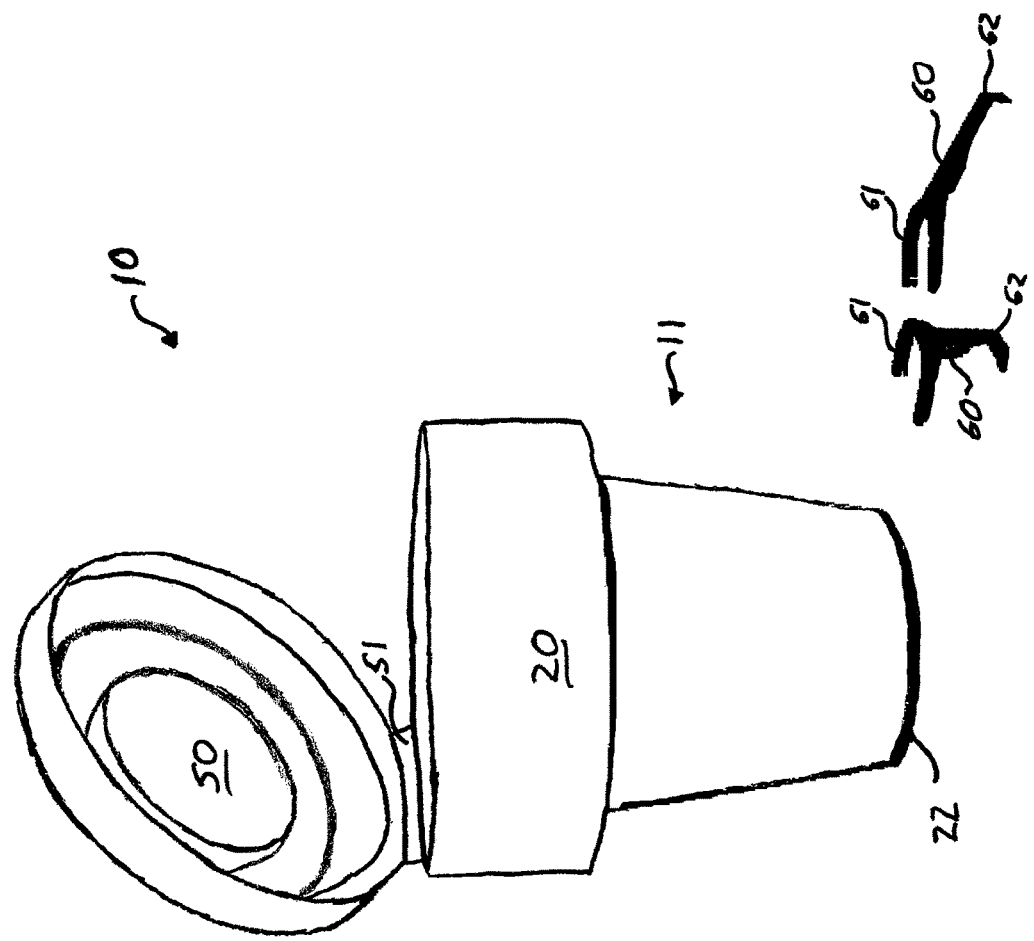
FIG. 1 is a front perspective view of a floss cup and associated portable flossers of the present invention.

An embodiment of the floss cup as shown in FIG. 1 includes a container or cup 10 having a body 11 sized to fit into a car cup holder. The floss cup of the present invention may hold portable flossers 60, both used and unused. The portable flossers usable with the present invention may have any variety of configurations of handles that hold taught lengths of flossing string or tape, and the exemplary portable flossers 60 shown have a body with a first end 61 and a second end 62. The first end 61 is formed with a U-shaped gap for holding a taught piece of floss therebetween. The second end 62 has a handle formed into a point (which simultaneously acts as a toothpick), having a width tapering inward from the first end 61 to the second end 62.

Figure 2:
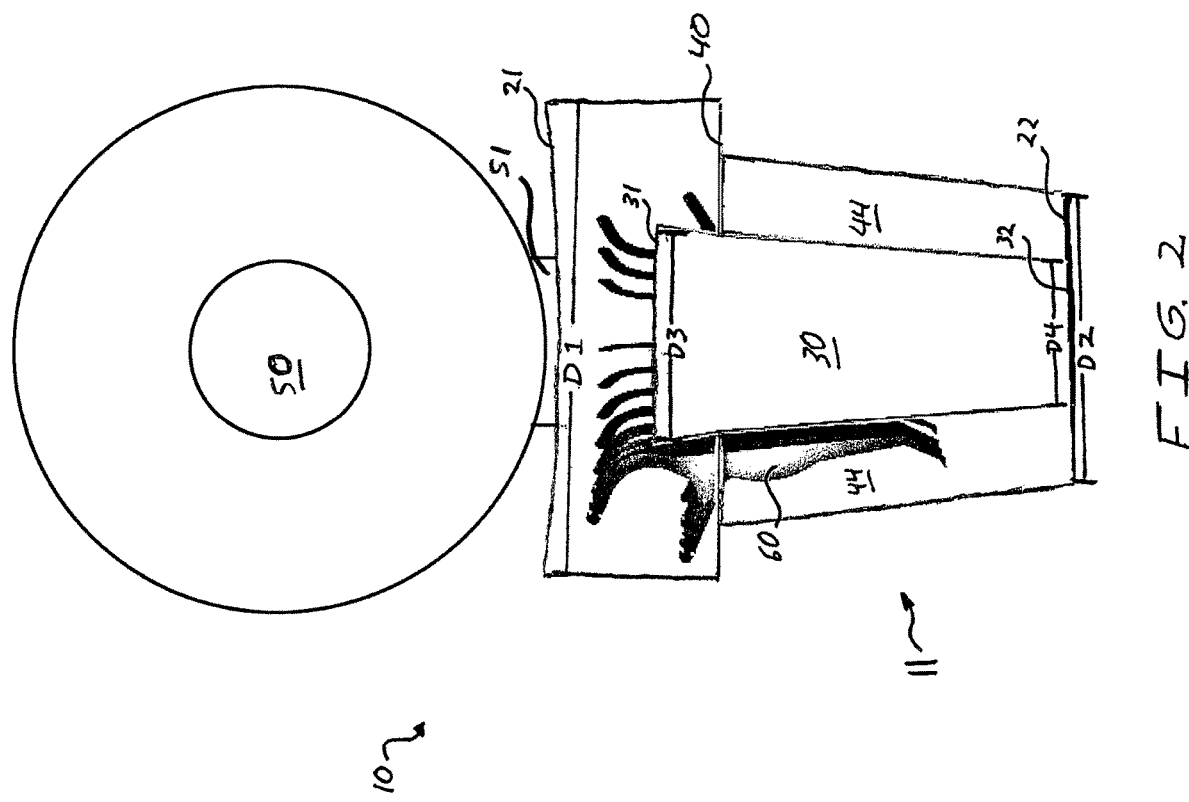
FIG. 2 is a perspective, partially cross-sectional view of the floss cup of FIG. 1.

The floss cup container body 11 includes a storage portion sized for receiving new, un-used portable flossers and a receptacle portion sized for receiving waste flossers after use, and optionally other waste. The exemplary floss cup body 11 is formed with two walls as shown in FIG. 2: a first or outer wall 20 extends around the container body and is defined by at least one width or diameter D1 that defines an upper rim 21, and may further include a second width or diameter D2 that defines a lower base 22, where the diameter between the outer wall decreases from rim 21 diameter D1 to base 22 diameter D2. A second or inner wall 30 is similarly defined by at least one width or diameter D3 that defines an upper rim 31, and may further include a second width or diameter D4 that defines a lower base 32, where the diameter between the inner wall decreases from the rim 31 diameter D3 to the base 32 diameter D4. The inner wall 30 diameters D3, D4 may be less than that of the outer wall 20's smallest diameter, which is diameter D2 in the embodiment depicted in FIG. 2. In the alternative, inner wall 30 may have a single uniform width or diameter between the rim 31 and base 32, which is less than that of the outer wall 20 width or diameter(s) D1, D2. Outer wall 20 may additionally be comprised of a single, uniform width or diameter. While the embodiment of the floss cup body 11 is shown having a circular axial cross-section, other cross-sectional shapes may be used, such as square or rectangular.

The inner wall 30 may be situated within the outer wall 20 such that an annular gap 44 is formed between said walls 20, 30. The base 22 of the outer wall may be located at the bottom edge of the cup 10 (and simultaneously acts as the base of body 11). The base 32 of the inner wall may also be located at the bottom edge of the cup 10. In the alternative, the inner wall base 32 may be separate and distinct from the outer wall base 22, such that the gap 44 between said inner wall 30 and said outer wall 20 further expands between the inner wall base 32 and outer wall base 22. In this alternative, the inner wall 30 is suspended within the outer wall 20 and held in place solely by an upper wall 40 extending between the inner and outer walls. In the embodiment shown, the opening formed within rim 31 of inner wall 30 forms a mouth for the receptacle portion of the floss cup 10 within the inner wall, and the space or gap between the inner and outer walls comprises the storage portion of the floss cup 10.

Figure 3:
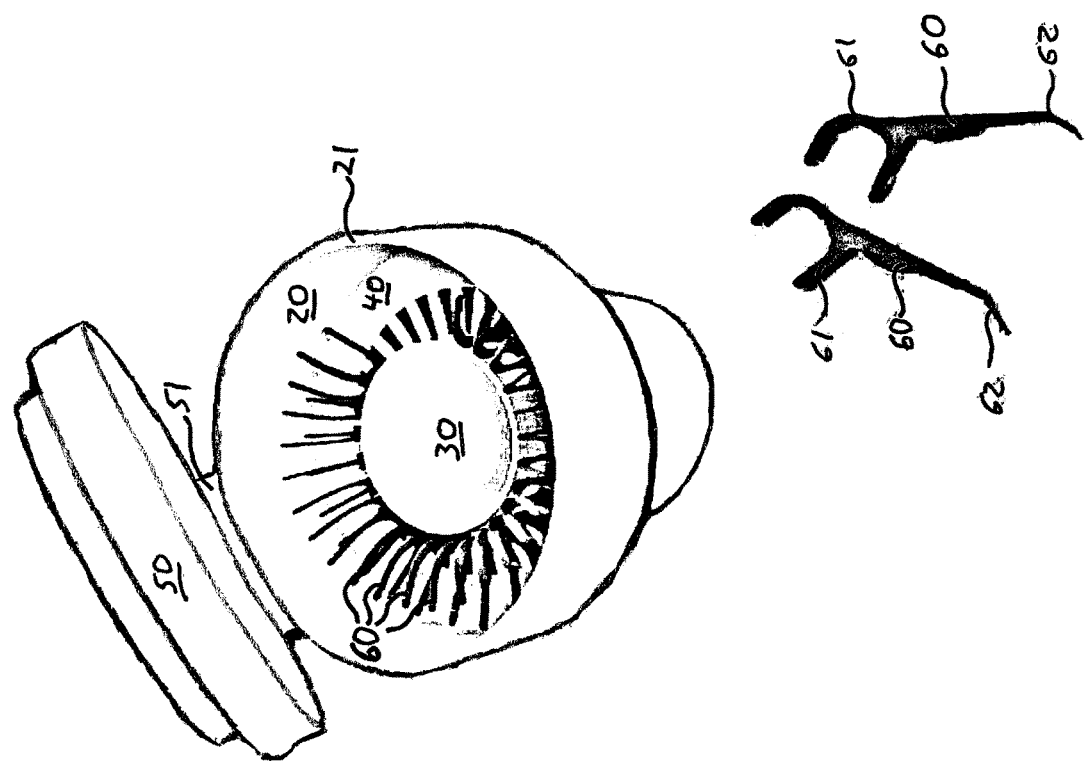
FIG. 3 is a top-down perspective view of the floss cup and portable flossers of FIG. 1, showing the portable flossers disposed within the floss cup.
Figure 4:
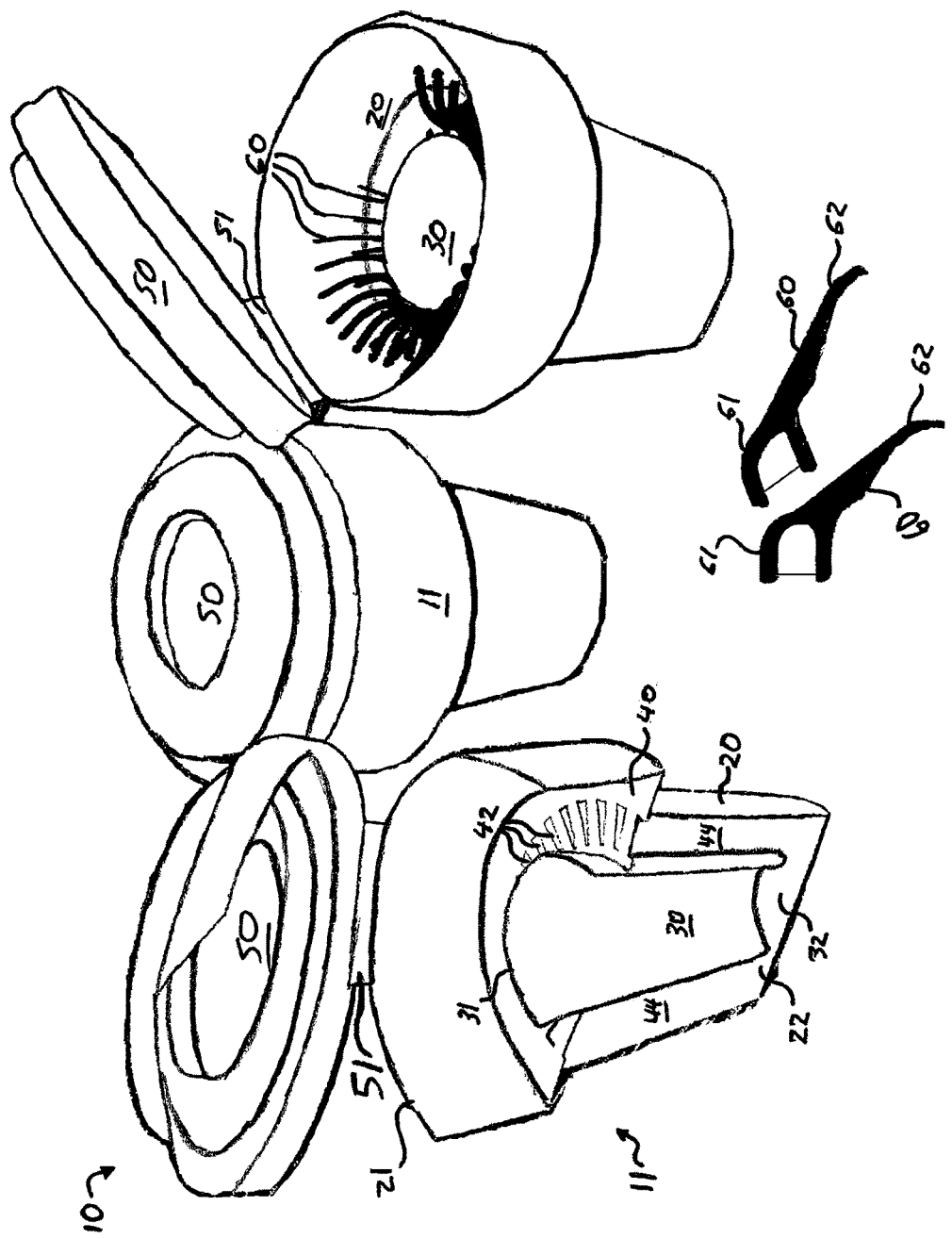
FIG. 4 is a perspective view of three separate floss cups of FIG. 1, the first being a partial cross-section showing the inner wall, outer wall, and upper wall, with the lid fully intact; the second being a fully intact floss cup with the lid closed; and the third being a fully intact floss cup with the lid open and showing the portable flossers disposed within the floss cup.

The upper wall 40 may extend between the inner wall 30 and outer wall 20 on a plane generally parallel to either of the bases 22, 32. The upper wall 40 may be disposed anywhere between the rims 21, 31 and bases 22, 32 of the outer wall 20 and inner wall 30, as shown in FIGS. 2-4. Alternatively, the upper wall 40 may extend from the rim 31 of the inner wall to a location between the rim 21 and base 22 of the outer wall 20, and vice versa. In a further alternative, the upper wall 40 may extend from the rim 31 of the inner wall to the rim 21 of the outer wall.

In the top portion of the floss cup, at least one opening or slot 42 is formed in upper wall 40, shown in the embodiment as being radially disposed around the mouth formed by rim 31, and is sized for receiving new, unused portable flossers 60 therein as shown in FIG. 3. The portable flossers 60 are disposed within the openings 42 in the cup 10 storage portion such that the flosser second end 62 is suspended within the gap 44 between the inner wall 30 and outer wall 20, and the first end 61 rests above the at least one opening 42. As shown in FIGS. 3-4, a plurality of equally spaced openings 42 are radially disposed around the upper wall 40. These openings 42 are large enough to allow the second end 62 to extend therethrough, but small enough to prevent the first end 61 from falling through and lodging the portable flossers 60 within the gap 44.

Cup 10 may also include a removable lid 50 that is secured via a hinge 51 to the rim 21 of the outer wall 20 to cover both the storage and receptacle portions over the top portion of the floss cup. This exemplary lid 50 as shown has a width or diameter sufficiently large enough to cover the rim 21 of the outer wall 20 and all of the contents inside of the body 11, which includes the new, un-used portable flossers 60 disposed in the at least one openings 42 of the storage portion and any waste that may be disposed within the inner wall 30 of the receptacle portion, among other things. Removable lid 50 does not need to be hingedly secured to the rim 21 as shown, and may instead be completely removable and re-securable by snap fit, threaded connection, adhesive, magnetic forces, and the like. Removable lid 50 may also be plastic wrap or cellophane, instead of a plastic lid.

The floss cup 10 of the present invention may be composed of paper, wax paper, plastic, cardboard, metal, polymer, ceramic, or biodegradable materials. While cup 10 may initially be presented with un-used portable flossers 60 already disposed therein and ready for use, an end user may re-fill the cup 10 by inserting more un-used portable flossers 60 into the at least one opening 42 of the upper wall 40 after expending the initial supply of such un-used flossers.

Dimensionally, the cup may be approximately 11 centimeters ("cm") tall, from the base 22 to the rim 21 of the outer wall 20. The diameter D1 of the rim 21 may be about 10 cm, while the diameter D2 of the base 22 may be about 6 cm. Diameter D3 of rim 31 may be about 5 cm, while the diameter D4 of the base 32 may be about less than 5 cm.

The orientation of the walls and upper wall of the floss cup need not be limited to what is shown in FIGS. 1-4. For example, the upper wall may cover a planar area of the top of the cup, with the inner wall acting as a divider extending across the width or diameter, or a non-diameter chord line of the outer wall. The gap would be disposed underneath the portion covered by the upper wall on a first side of the inner wall, while used portable flossers and other waste may be disposed on a second side of the inner wall, which would remain uncovered by the upper wall.

In the method of storing, using, and disposing of portable flossers using the floss cup of the present invention, the user will open or remove the lid 50 (whether it is a cellophane cover, or the hingedly attached lid as shown in the figures) from the body to expose the un-used portable flossers radially disposed around the upper wall 40. The user may then pull one of the new, unused flossers 60 from the at least one opening or slot 42 of the storage portion of the container body, and use the first end 61 of the flosser 60 to floss their teeth. Once the user is done flossing with the flosser 60, he/she may then dispose of the used flosser by placing the flosser through the receptacle opening into the receptacle portion of the container body (or within the rim of the inner wall 30). The lid 50 may then be closed again to secure the contents within and prevent contamination of the un-used flossers 60 from outside sources.

If an end user expends all of the un-used flossers 60 provided on the upper wall 40 of the cup, they may re-fill the cup 10 themselves by placing new, un-used flossers 60 into the now empty slots 42. Alternatively, the entire cup 10 may be disposed of, and a new cup may be purchased which comes pre-stocked with un-used flossers 60.

Thus, the present invention provides one or more of the following advantages: 1) a portable floss container that allows for easy, sanitary access to unused portable flossers; and 2) a portable floss container that allows for easy, sanitary disposal of used, unsanitary portable flossers and other waste.

While the present invention has been particularly described, in conjunction with one or more specific embodiments, it is evident that many alternatives, modifications and variations will be apparent to those skilled in the art in light of the foregoing description.

Thus, having described the invention, what is claimed is:

1. A container for portable flossers, comprising:
   a plurality of unused portable flossers having a body with a first end and a second end, the first end holding a taught piece of floss, and the second end having a handle;
   a container body having an upper rim portion having a first diameter, and a base portion having a second diameter less than the first diameter, said base portion including a bottom edge;
   an inner wall disposed within the container body for receiving waste therein, the inner wall having a rim proximate said container body upper rim portion, a lower base, and a length therebetween, said rim having a third diameter, said lower base integral with the bottom edge of the base portion such that said lower base and said bottom edge of the base portion form a container base, said lower base having a fourth diameter less than the third diameter, wherein an annular gap is formed between an outer wall of the bottom edge of the base portion and the inner wall lower base and extends along a length of the base portion and the inner wall length;
   an upper wall extending from the rim of the inner wall to the upper rim portion, the upper wall including at least one opening disposed thereon and sized for receiving the plurality of unused portable flossers, such that the second end of the plurality of unused portable flossers is disposed in the gap, and the first end of the plurality of portable flossers rests within the upper rim portion and above the at least one opening on the upper wall; and
   a removable lid having a diameter large enough to cover a top edge or rim of the upper rim portion.

2. The container of claim 1 wherein the removable lid is hingedly secured to the outer wall.

3. The container of claim 1 wherein the at least one opening comprises a plurality of openings radially disposed around the upper wall of the cup.

4. The container of claim 1 wherein the inner wall lower base is separate and distinct from the base portion.

5. The container of claim 4 wherein the gap between said inner wall and said outer wall expands between the inner wall lower base and the outer wall base.

6. The container of claim 1 wherein the lid is cellophane or plastic wrap.

7. The container of claim 1 wherein the body is composed of a material selected from the group consisting of paper, wax paper, cardboard, plastic, metal, or biodegradable material.

8. A container comprising:
   a container body or cup having a base, an upper rim portion having a first diameter and a base portion therebetween, said base portion having a second diameter less than the first diameter;
   an inner wall disposed within the container body, the inner wall having a first end comprising a rim, a second end comprising a lower base, and a length therebetween, said rim having a third diameter, said lower base integral with the container base, said lower base having a fourth diameter less than the third diameter, wherein an annular gap is formed between an outer wall of the container body or cup base and the inner wall lower base and extends along a length of the base portion and the inner wall length; and an upper wall extending from a top edge or rim of the inner wall to the upper rim portion, the upper wall including at least one slot disposed thereon;

wherein the inner wall is sized to receive waste therein, and the upper wall at least one slot receives at least one unused portable flosser therein, such that a first end of the unused portable flosser rests within the upper rim portion and above said at least one slot, and a second end of the portable flosser rests below said at least one slot and is suspended within the gap.

9. The container of claim 8 further including a removable lid having a diameter large enough to cover a rim of the upper rim portion.

10. The container of claim 9 wherein the removable lid is hingedly secured to the upper rim.

11. The container of claim 8 wherein the inner wall lower base is separate and distinct from the outer wall base portion, and the gap between said inner wall lower base and said outer wall base portion expands between the inner wall lower base and the outer wall base portion.

12. The container of claim 8 wherein the at least one slot comprises a plurality of slots are radially disposed around the upper wall of the cup.

13. The container of claim 8 wherein the lid is cellophane or plastic wrap.

14. The container of claim 8 wherein the body is composed of a material selected from the group consisting of paper, wax paper, cardboard, plastic, metal, or biodegradable material.

* * * * *